(12) United States Patent
Sorna et al.

(10) Patent No.: US 12,343,571 B2
(45) Date of Patent: Jul. 1, 2025

(54) FILTERING FACE MASK

(71) Applicant: The United States of America as represented by the Secretary of the Navy, Arlington, VA (US)

(72) Inventors: Mark Sorna, Silverdale, WA (US); Jacob Yates, Poulsbo, WA (US); Nathan Schuyler, Silverdale, WA (US); Jose Ruiz, Bremerton, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 1152 days.

(21) Appl. No.: 16/873,908

(22) Filed: Aug. 7, 2020

(65) Prior Publication Data

US 2021/0379420 A1 Dec. 9, 2021

Related U.S. Application Data

(60) Provisional application No. 63/102,253, filed on Jun. 5, 2020.

(51) Int. Cl.
| | |
|---|---|
| *A62B 18/02* | (2006.01) |
| *A41D 13/11* | (2006.01) |
| *A41D 31/26* | (2019.01) |
| *A62B 18/08* | (2006.01) |
| *A62B 18/10* | (2006.01) |

(Continued)

(52) U.S. Cl.
CPC ........ *A62B 18/025* (2013.01); *A41D 13/1146* (2013.01); *A41D 13/1176* (2013.01); *A41D 31/26* (2019.02); *A62B 18/084* (2013.01); *A62B 18/10* (2013.01); *A62B 23/02* (2013.01); *B01D 39/18* (2013.01); *B01D 39/2065* (2013.01);

(Continued)

(58) Field of Classification Search
CPC ...... A61M 16/06; A62B 23/02; A62B 23/025; A62B 18/025; A62B 18/02; A62B 18/084; A62B 18/10; A41D 13/11; A41D 13/1107; A41D 13/1138; A41D 13/1146; A41D 13/1161; A41D 13/1176
See application file for complete search history.

(56) References Cited

U.S. PATENT DOCUMENTS

| | | | | |
|---|---|---|---|---|
| 2005/0109343 | A1* | 5/2005 | Flanningan | ........ B29C 45/0062 128/206.17 |
| 2006/0254592 | A1* | 11/2006 | Anders | ................ A62B 18/084 128/206.28 |

(Continued)

FOREIGN PATENT DOCUMENTS

WO   WO-2016167531 A1 * 10/2016   ............. A62B 18/04

OTHER PUBLICATIONS

English Machine Translation of WO-2016167531-A1 provided by Espacenet (Year: 2016).*

(Continued)

*Primary Examiner* — Joseph D. Boecker
*Assistant Examiner* — Brian T Khong
(74) *Attorney, Agent, or Firm* — Stephen J. Leahu; Naval Undersea Warfare Center, Keyport

(57) ABSTRACT

A filtration mask protects the wearer against airborne hazards. The mask is reusable and may be used in a number of configurations. The mask includes filters located to the side and beneath the line of sight of the wearer. The filters may be tailored to the use and type of environmental hazard.

45 Claims, 19 Drawing Sheets

(51) Int. Cl.
   *A62B 23/02*    (2006.01)
   *B01D 39/18*    (2006.01)
   *B01D 39/20*    (2006.01)
   *B33Y 80/00*    (2015.01)

(52) U.S. Cl.
   CPC .......... *B33Y 80/00* (2014.12); *A41D 2500/50* (2013.01); *B01D 2239/0435* (2013.01)

(56) References Cited

U.S. PATENT DOCUMENTS

| | | | | |
|---|---|---|---|---|
| 2006/0283453 | A1* | 12/2006 | Haddad | A62B 23/02 |
| | | | | 128/206.16 |
| 2010/0218761 | A1* | 9/2010 | Flannigan | B29C 65/483 |
| | | | | 128/201.19 |
| 2015/0034098 | A1* | 2/2015 | Schumacher | A41D 13/1138 |
| | | | | 128/863 |
| 2021/0316170 | A1* | 10/2021 | Domoy | A62B 23/025 |

OTHER PUBLICATIONS

3M Company, "Comfort, Trust, Versatility Respirators for Your Workplace" 3M Reusable Respirators Catalogue Datasheet, 70-0710-9082-6, 2013, 3M Company, St. Paul, MN (8 pages).
3M Company, "Protection that works as hard as you do." 3M Disposable Filtering Facepiece Respirators Catalogue Datasheet, 70-0714-8838-4, 2014, 3M Company, St. Paul, MN (8 pages).
3M Company, Selection Guide for 3M Reusable Respirators, 70-0708-4486-8, 2015, 3M Company, St. Paul, MN (1 page).

* cited by examiner

FILTERING FACE MASK

CROSS REFERENCE TO OTHER PATENT APPLICATIONS

The present application claims the benefit of U.S. provisional patent application 63/102,253 filed Jun. 5, 2020 and titled: "Tactical Armed Forces Filtering Face Mask," the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

The present application is also related to design applications for "Filtered Face Mask," and "Filtered Face Mask with Cap," U.S. patent application Ser. Nos. 29/742,297 and 29/742,296, which have granted as U.S. Design Pat. Nos. D946,745 and D946,744, respectively both filed the same day herewith and also incorporated herein by reference.

The present application is additionally related to design applications for "Filtered Face Mask Respirator," and "Filtered Face Mask Respirator with Cap," U.S. patents application Ser. Nos. 29/742,298 and 29/742,295, which have granted as U.S. Design Pat. Nos. D946,746 and D946,743, respectively, both filed the same day herewith and also incorporated herein by reference.

BACKGROUND OF THE INVENTION

When heading into areas of airborne hazards, including, for example, industrial hazards such as painting, coating removal and welding; a natural disaster zone; hazmat spills; a field hospital; other medical environments; or areas of infectious disease, personal protective equipment (PPE) is a necessity. Facemasks are one common type of PPE. A face mask ideally protects the wearer from inhaling contaminants and may also be configured to inhibit the exhalation of disease causing pathogens. The PPE must be easy to use, quick to don, and must not interfere with the wearer's ability to perform their mission and job duties while providing maximum protection from particulates, pathogens, or harmful aerosols in the air.

Prior art face masks such as those shown in FIGS. 1A-1C have several limitations. The prior art device of FIG. 1A, shows a commonly available facemask 2 made of cloth or other filtration material. These masks have a fixed filtration capability based solely on the material used to manufacture the mask. The resulting filtration or hazard mitigation capability is fixed by the material used to fabricate the masks and cannot be altered or changed according to the type of hazard or environmental conditions encountered. Masks like those in FIG. 1A are also intended for a single use and are disposed of after wearing thereby creating an accumulation of biohazard waste.

Masks such as those shown in FIG. 1A are produced in generic sizes and can also be ill fitting. The poor fit limits the effectiveness of the protection provided to both the wearer and to others. Air escaping or entering at locations where the mask does not fit properly to the user's face can cause hazards to be inhaled; or pathogens to be exhaled towards others.

Masks such as those shown in FIG. 1A, therefore sometimes further consist of a thin metal piece 4. Metal piece 4 enables mask 2 to better seal the mask in the area around the bridge of the nose. An improper fit around the bridge of the nose results in the wearer's breath escaping at this point. Not only is this escape a potential hazard to others should the wearer be themselves infectious, but this escape can fog eyewear and face shields worn as additional PPE. Fogging of these devices adversely impacts the wearer's vision and compromises the wearer's ability to perform tasks. In severe cases, fogging may detract from vision to such a degree that it can present a safety hazard in certain environments.

Modifications to the basic prior art mask can include a respirator valve 5. FIG. 1A illustrates an N95 compliant mask with particulate respirator valve model number 990V N95 manufactured by 3M. Respirator valve 5 is a one-way valve that allows exhaled air to bypass the mask filtration material. Valve 5 can be useful when the air is particularly laden with particulates such as ash from wildfires or sawdust in a mill. When in valve 5 is in use, exhaled air is not filtered while inhaled air passing through the mask material is filtered. Valve 5 can make it easier to wear mask 2 for long periods. Valve 5 can also reduce the likelihood that contaminated air that seeps thorough gaps in the mask when worn is inhaled since the exhalation cycle helps clear the interior of the mask.

A second type of prior art mask 6 is shown in FIGS. 1B and 1C. These prior art devices can be especially cumbersome to use especially in an active hostile zone such as a military field hospital, disaster response, or hazmat area. In the prior art device of FIGS. 1B and 1C a filter 8 is placed directly in front of the wearer. Unlike mask 2 of FIG. 1A, not all of the mask 6 surface is porous filtration. Filter 8 must therefore be relatively large to obtain sufficient surface area to enable proper inhalation and exhalation. The size and location of filter 8 also makes seeing around or over filter 8 difficult and limits the field of vision for the wearer.

Although mask 6 can be reused, changing filter 8 can be difficult. To change filter 8, mask 6 must be removed. Performing this action thus requires the wearer to first retreat to a safe location where the mask can be safely removed. These operational steps reduces the wearer's time on station and may require additional personnel be present on the scene while the initial user retreats to remove and replace the filter 8.

Mask 6, which is 3D printed must also additionally be formed in generic sizes and shapes making it likely that at least some portion of mask 6 does not fully fit to the user's face. At these locations, there is no seal between the wearer and the mask, allowing ambient and potentially hazardous air to enter; and if the user is infectious, also enabling hazardous exhalations to escape. The lack of a seal can also lead to fogged up eyewear and its associated problems as previously described above.

In the prior art masks of FIGS. 1A-1C, the attachments 10 used to secure the mask to the face and head are thin and usually consist of only an elastic band. Attachments 10 are typically stapled or secured to the prior art masks with staples or small built-in clips 12 at a fixed location on the mask. These types of attachment mechanisms allow only elastic straps to be used and do not easily allow repositioning of the straps.

SUMMARY OF THE INVENTION

The present invention includes recognition of the problems and limitations of the prior art. The invention provides a new and novel type of PPE mask. The invention protects the wearer during use in a variety of field conditions and applications; and while performing a number of different types of missions and activities.

According to one aspect of the invention, the face mask includes filters located to the side of the mask. This location makes the filter less likely to interfere with the vision of the wearer than in prior art devices.

According to another aspect of the invention, the face mask includes two such filters located proximate the cheeks of the wearer. This feature increases the filtration area, increases airflow, and improves visibility over the filter architectures of the prior art.

According to yet another aspect of the invention, the invention includes quick release filtration housings to easily replace a spent filter. This feature reduces the time needed to replace the filter and does not require removal of the mask to effect this operation. The filtration housings may optionally be threaded for a more secure attachment to the mask. In models having at least two filters, when one filter is not needed or in use, a cap may be placed over the filter.

According to still another aspect of the invention, the filter material is changeable as well as replaceable. This feature enables the mask to be used in a variety of conditions and to protect against a variety of airborne hazards by selecting the filter material most appropriately matched to the hazards or environmental conditions. This feature also enables the mask to be reused by replacing clogged or exposed filter material with replacement filter material.

According to another aspect of the invention, the facemask includes a flexible seal around the perimeter adjacent the wearer's face. The flexible seal, which can be formed of, for example, silicon, creates a substantially airtight seal between the wearer and the mask. Thus, unlike in prior art devices, there are no air gaps resulting from ill-fitting devices and the corresponding consequence of exposure to airborne hazards and fogging of eyewear is eliminated.

According to yet another aspect of the invention a valve located on the mask allows the mask to be used as a respirator. In this configuration, inhaled air passes through one or both of the side filters, while a check valve for exhalation is closed. During exhalation, the check valve opens allowing exhaled air to escape.

According to still another aspect of the invention, at least one of the side filters may be closed off via a cap device. The cap device prevents air from passing through mask at that location.

According to another aspect of the invention, the silicon face seal allows the mask to be custom fit to the user. The invention's interchangeable filters then further permit the mask of the present invention to be worn by an individual user in a variety of applications and conditions by simply selecting the appropriate filter material without needing a second or different mask when the use changes. These features of the invention enable the wearer to have a personalized mask they can take with them and use no matter what the task or conditions encountered. Further personalization of the mask can be had by coloring the mask during the manufacturing process.

According to still another aspect of the invention, the invention can be produced using additive manufacturing. This method enables the mask to be produced virtually anywhere including aboard ships, in hospitals, and on-site in other field locations near the point of use. Optionally, the invention can be manufactured using injection molding. In one embodiment, a two-part injection mold may be used. This technique can even be employed in the field, including a two-part cavity and core mold, which may be used with resin for the mask, and silicon for the face seal.

Further advantages and features of the present invention will be described in detail below.

BRIEF DESCRIPTION OF THE DRAWINGS

Like reference numerals refer to similar elements or features throughout the drawings.

DESCRIPTION OF THE INVENTION

Figure 1A:
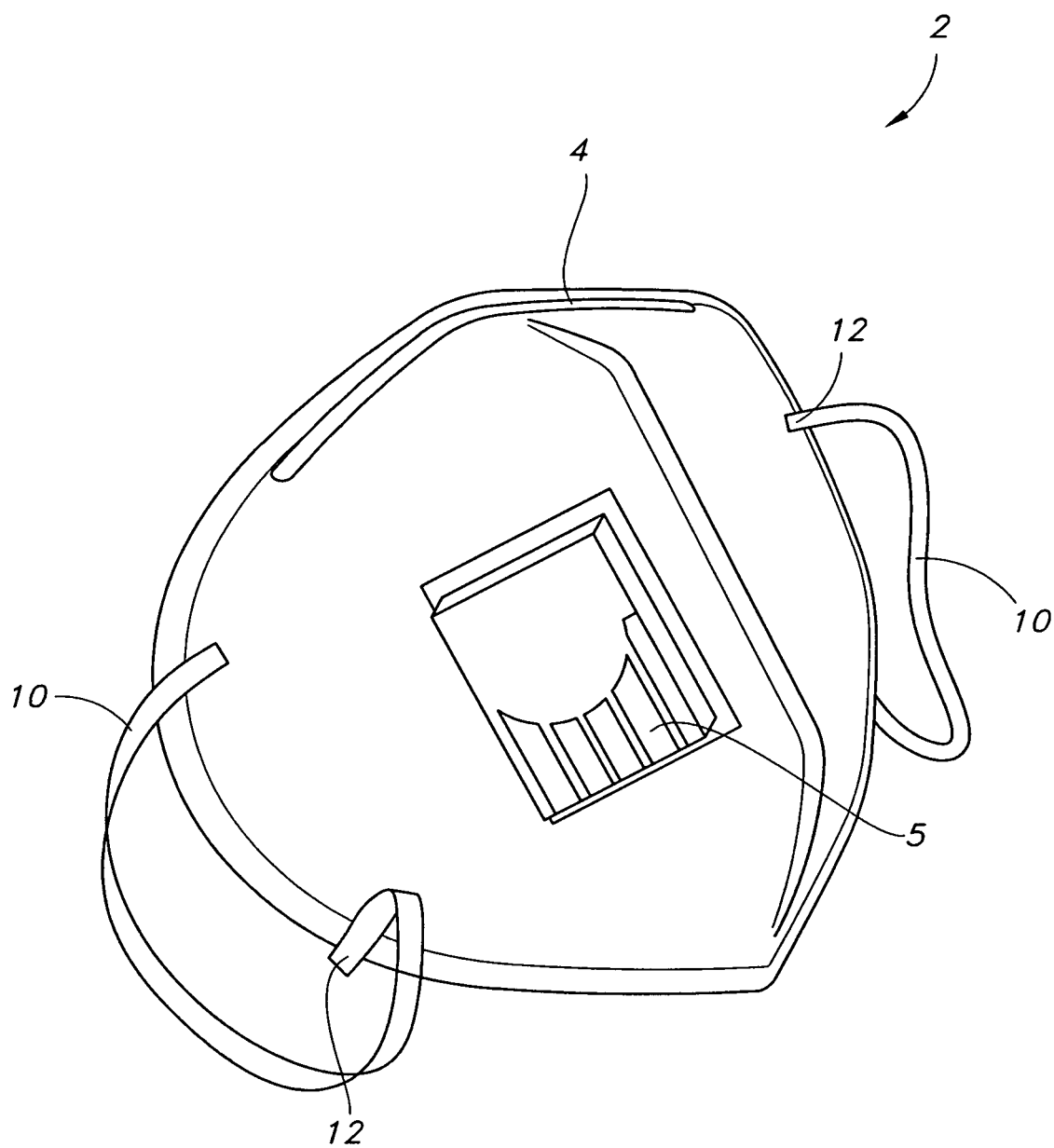
FIG. 1A is a commonly available prior art face mask typically made of cloth or a fabric filtration material.
Figure 1B:
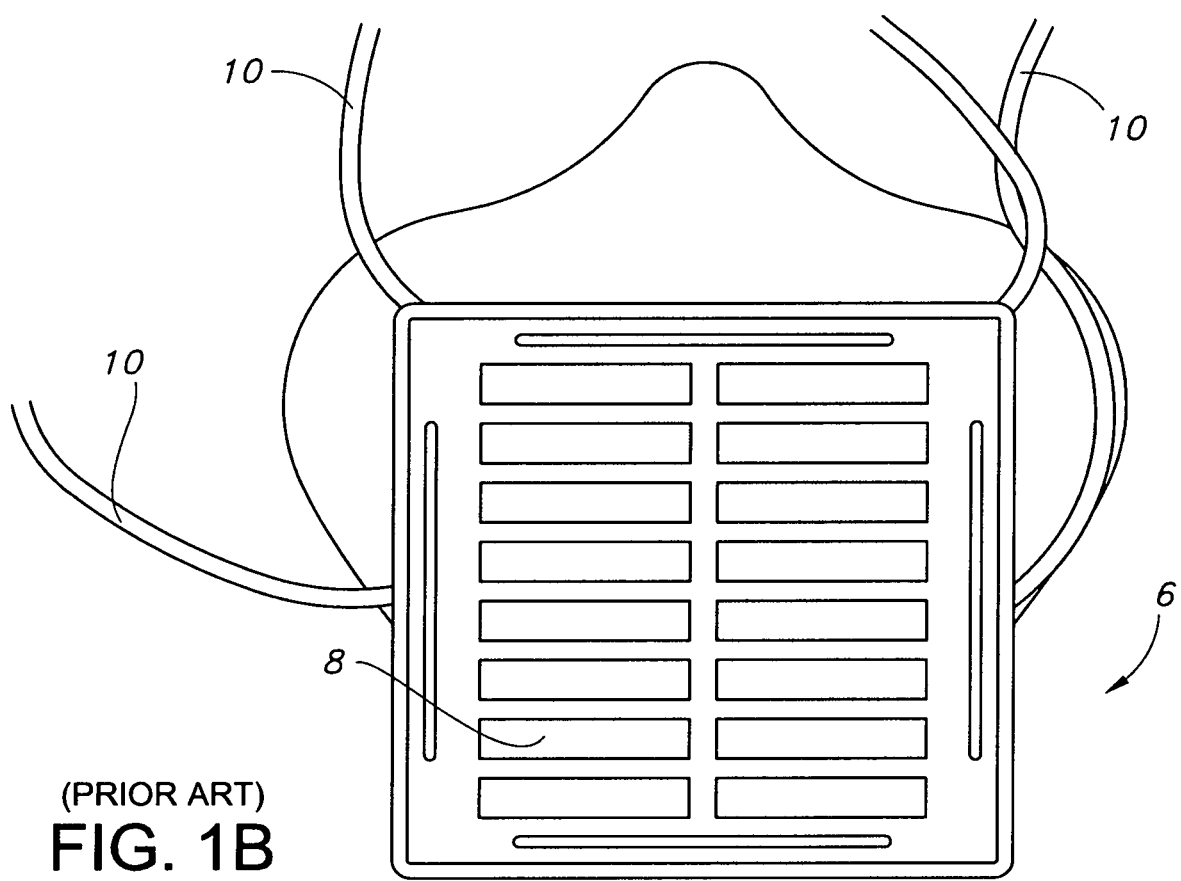
FIGS. 1B-C are illustrations of a prior art mask having a filter housing.
Figure 1C:
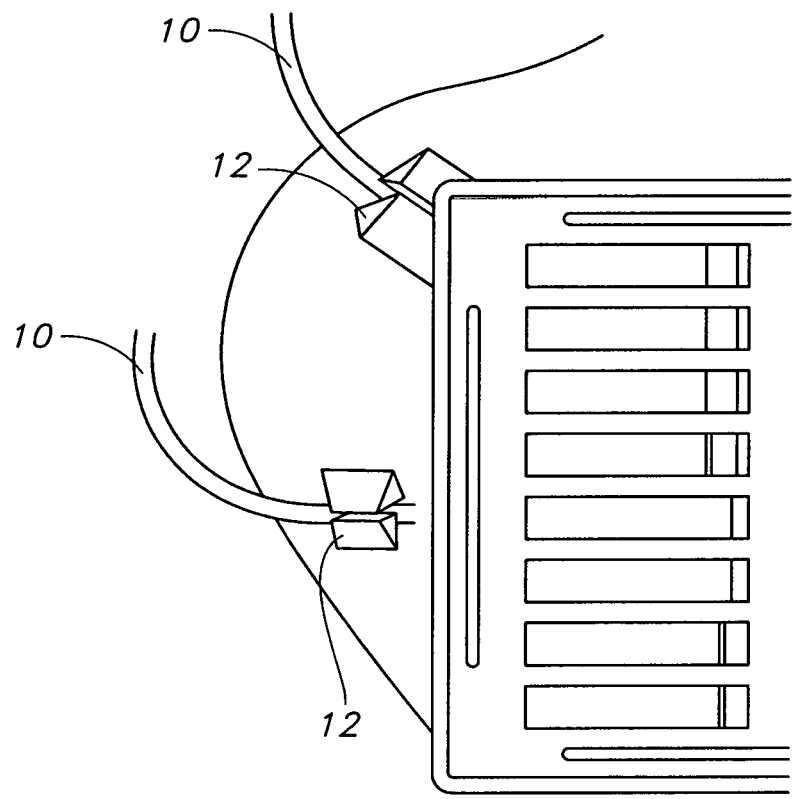
Figure 2A:
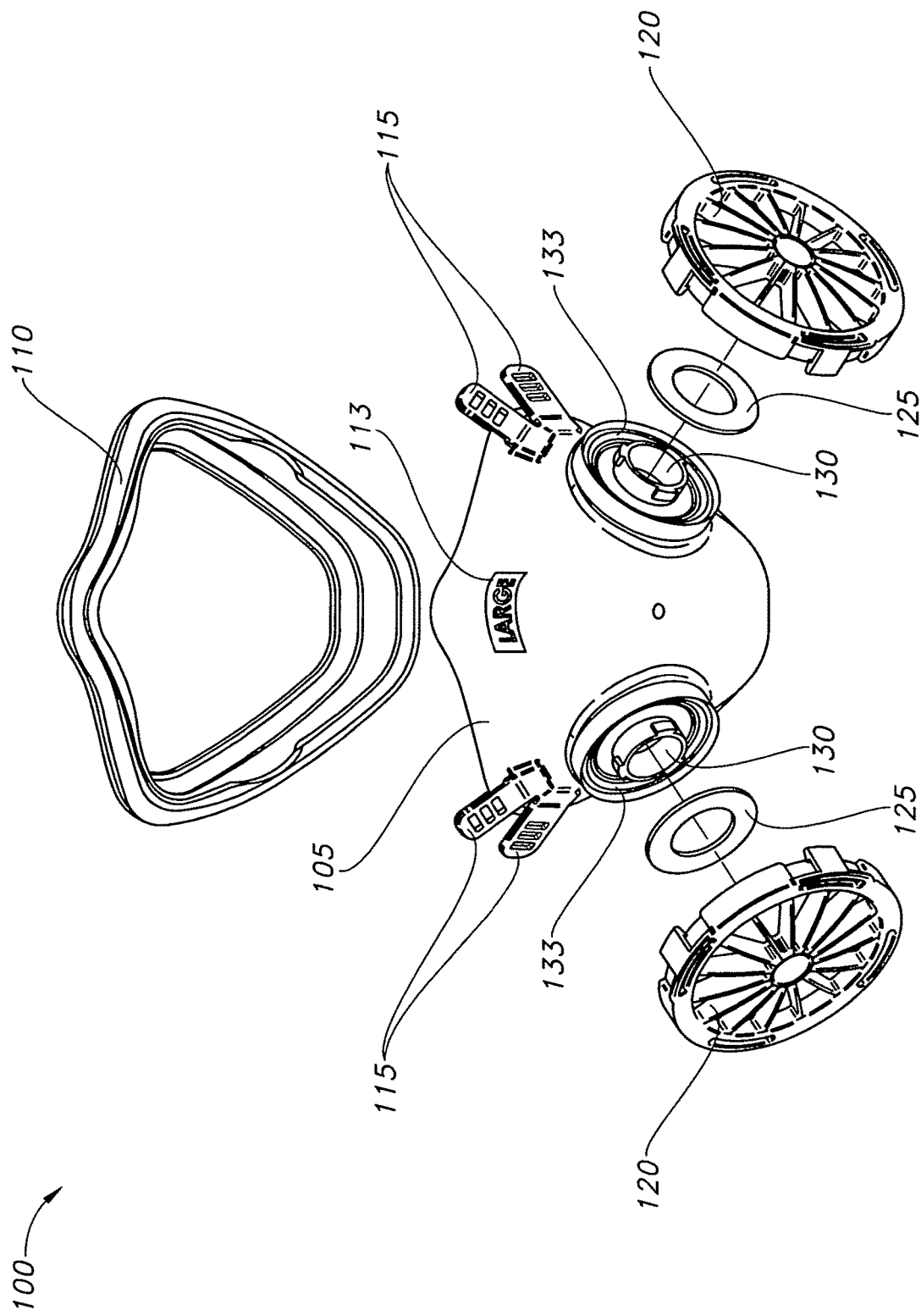
FIGS. 2A-D are illustrations of a filtering face mask, according to an embodiment of the invention.

FIG. 2A shows an exploded view of filtering facemask 100 according to one embodiment of the invention. Filtering face mask 100 comprises a mask main body 105, silicon face seal 110, sizing information area 113, a plurality of strap attachments 115, a plurality of filter housings 120, a plurality of silicon attachment o-rings 125, an optional plurality of filter valves 130, and quick-click locking mechanism 133. Filter housings 120 secure filtration material as will be discussed in further detail below.

When mask 100 includes filter valve 130, valve 130 may optionally comprise a one way check valve to reduce breathing resistance when exhaling. With valve 130 open inhaled air passes through the filter material. On the exhalation cycle, check valve 130 prevents exhaled air from passing through the filter material. The exhaled air is directed downward by the construction and geometry of housing 120 and valve 130 construction. When valve 130 includes a check valve, mask 100 can be used dirty particulate environments but will likely not be sufficient for disease control since potentially infectious, unfiltered exhaled air is expelled.

In a preferred embodiment of the invention, the materials included in construction of mask 100, and other masks constructed according to the teachings of the invention, meet ISO 10993 standards for use against skin. Compliance with ISO 10993 additionally facilitates use of PPE under Emergency Use Authorization, as a stopgap measure for medical masks during the COVID 19 pandemic. ISO 10993 is incorporated herein by reference.

Filtering face mask 100 and masks made according to the teachings of the invention may be produced using a variety of methods. For example, face mask 100 may be produced via additive manufacturing, or 3D printing, using techniques known to those of skill in the art. Producing mask 100 via additive manufacturing enables the invention to be manufactured in a variety of settings including field locations at or near the point of use. Caution should be exercised when selecting 3D printing materials since some of these materials can be porous. The 3D printing process can also create small pockets which can exacerbate potential permeability problems but which may still nonetheless be satisfactory for some applications. According to one possible embodiment of the invention, HP's ⓓ® nylon 12, manufactured by Hewlett Packard Company was used to manufacture masks 100 and 200. The fabrication material can be a color material or colored to further personalize the mask for the user.

Optionally, masks of the present invention can be manufactured using a two part polyethylene resin in an injection mold. When using this manufacturing method, face seal 110 is made using an over-mold. This technique means body 105 mask is molded first and then face seal 110 is molded over mask body 105. Sizing information area 113, strap attachments 115, filter valve 130, and quick-click locking mechanism are optionally molded at the same time as mask main body 105. As with additive manufacturing methods, the injection molded mask may be colored to further personalize the mask for the user.

Figure 2B:
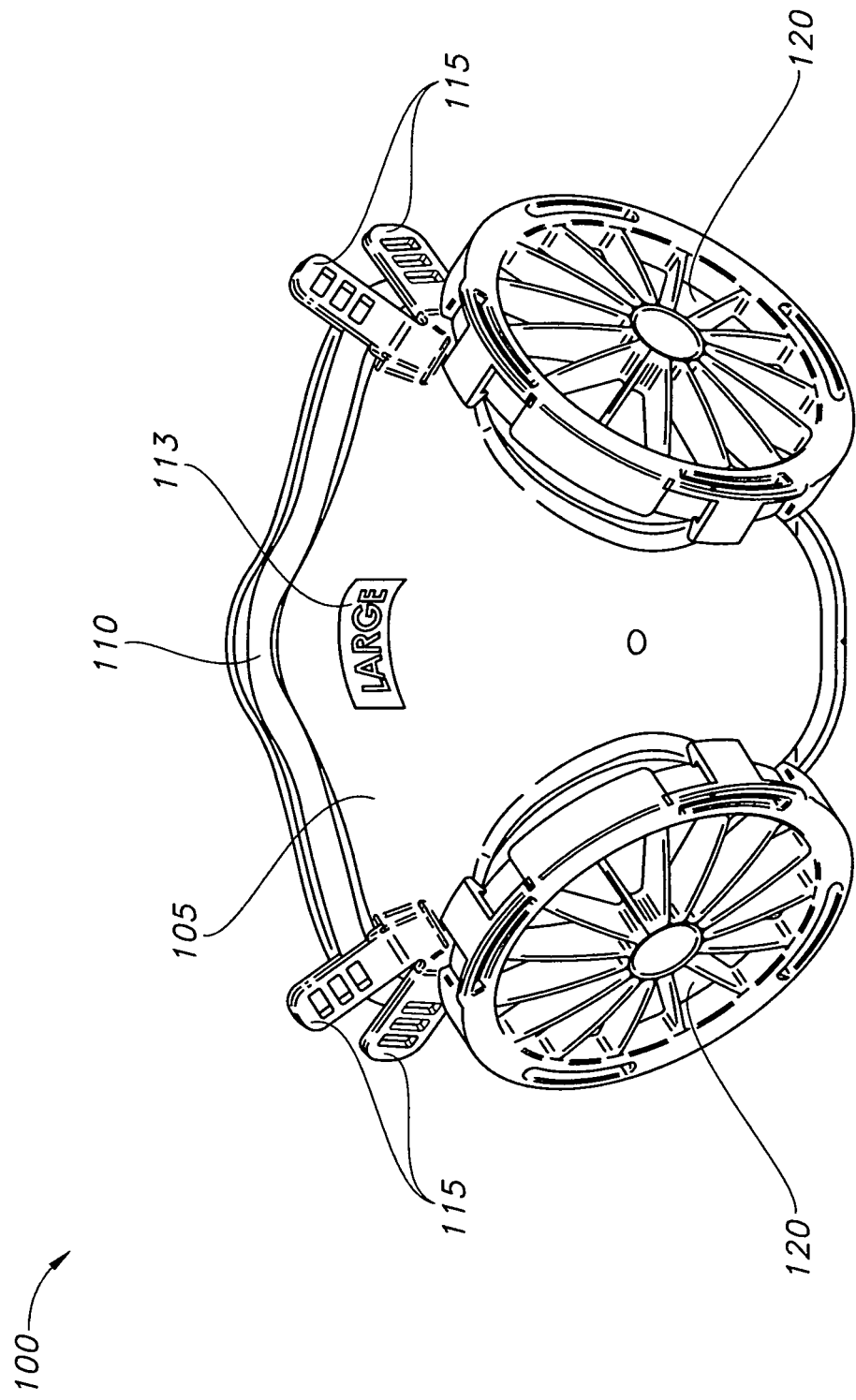

Silicon attachment o-ring 125 sits around filter valve 130, and between mask main body 105 and filter housing 120. The flat o-ring design facilitates eliminating aerosol and airborne particle leakage around the edges of the filter media. Filter housing 120 slides on to filter valve 130, turning a quarter turn clock-wise to lock in place via quick-click locking mechanism 133. Filter housing 120 is molded separate from mask main body 105. The fully assembled mask 100 is shown in FIG. 2B.

Figure 2C:
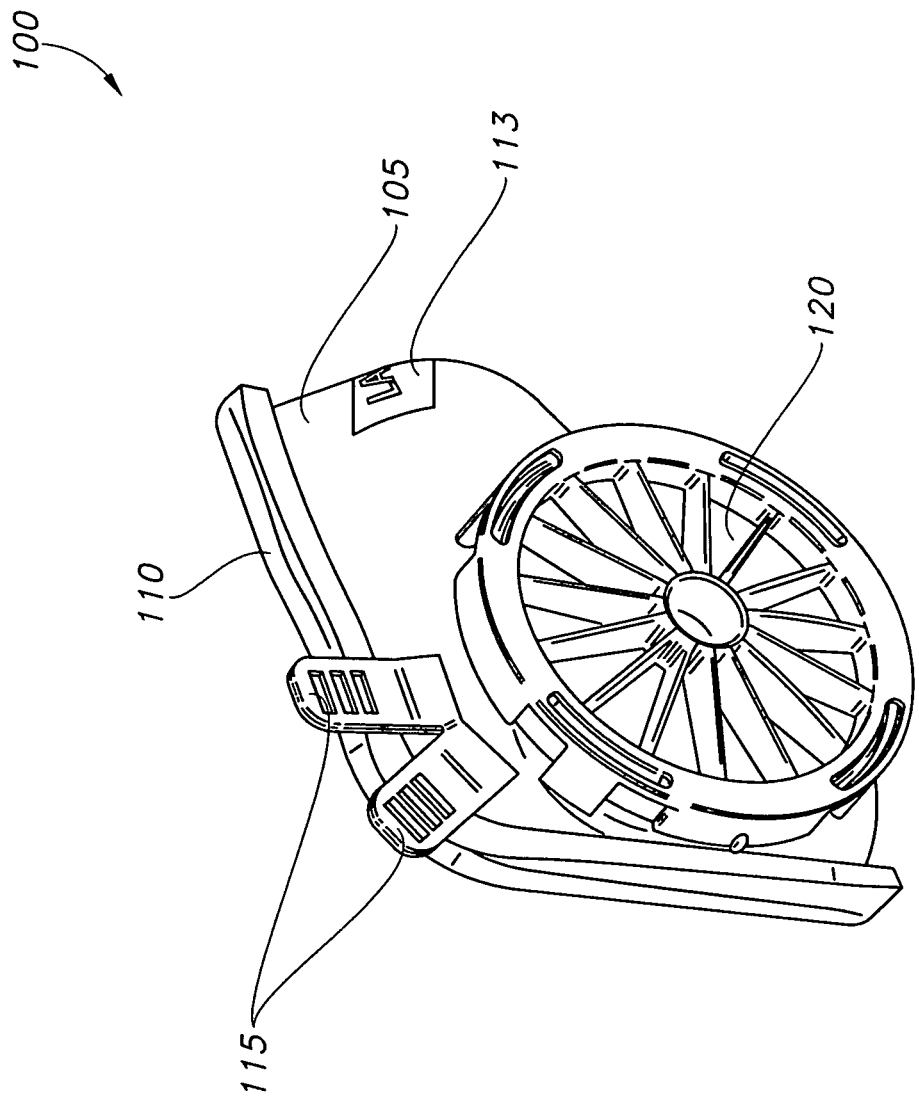

FIG. 2C is a side view of filter face mask 100, showing the position of filter housing 120. The position of housing 120 allows greater field of vision over prior art masks. The low-profile configuration of housing 120 combined with its location on the mask results in a filter mechanism that is not likely to interfere with the vision and field of view of the wearer, while simultaneously maximizing the surface area of the filter.

Figure 2D:
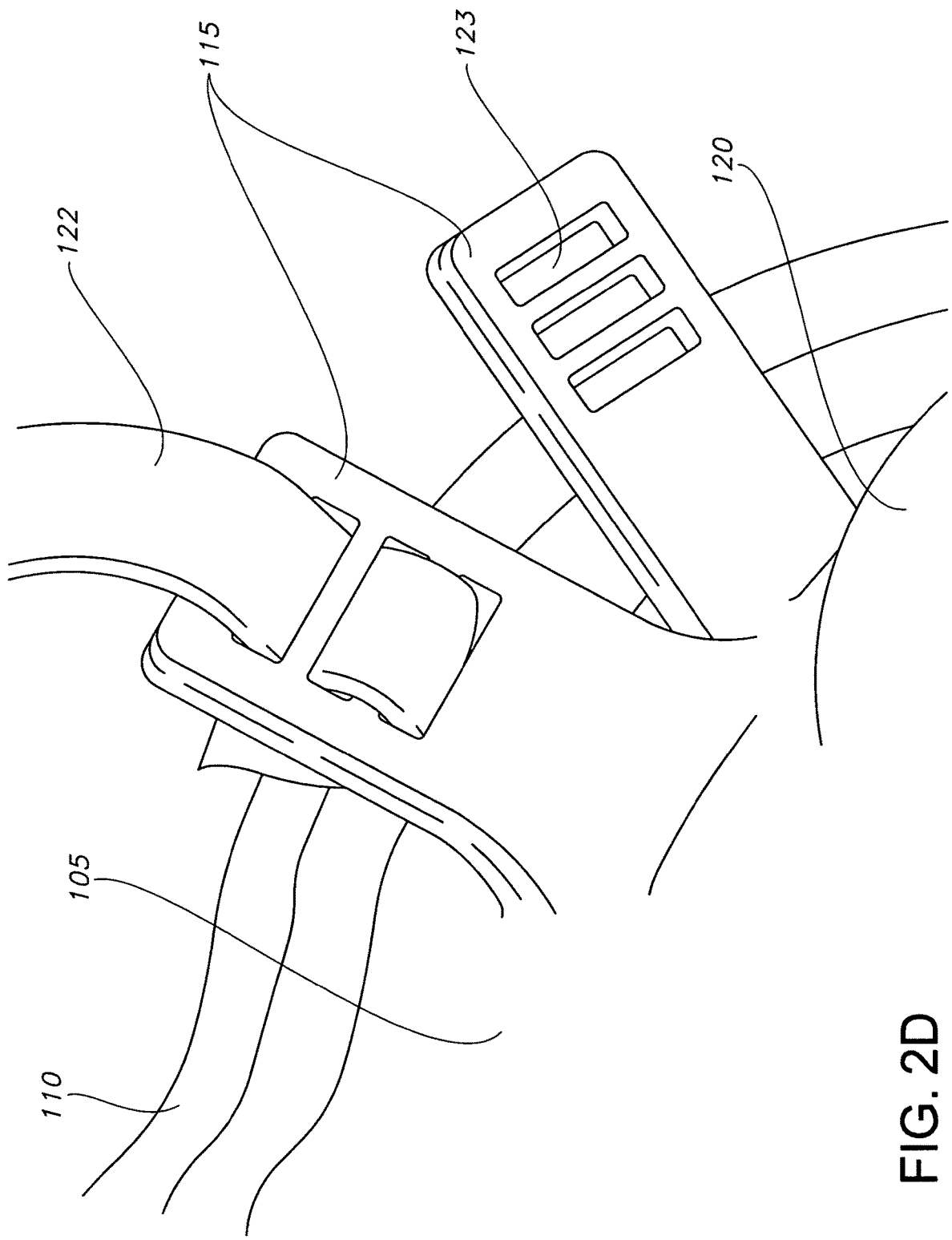

In one possible embodiment of the invention, strap attachments 115 are molded with several lacing slots 123, as shown in FIG. 2D. Lacing slots 123 allow multiple types of strap material 122 to be used, such as, for example: paracord, elastic, or boot lacing. The various types of strap materials 122 may be threaded through lacing slots 123 in many ways to secure strap material 122 to filtering face mask 100. Lacing slot 123 therefore facilitates field repair of mask 100 using a variety of materials likely to be on hand.

In use, strap material 122 is woven through lacing slot 123 to the preference of the wearer. The wearer presses silicon face seal 105 to their face, securing filtering face mask 100 about the wearer's head with strap material 122. A wearer breathes normally allowing filter housing 120 to prevent hazards such as for example: particulates, aerosols, or pathogens in the air from entering and exiting filtering face mask 100.

Figure 3A:
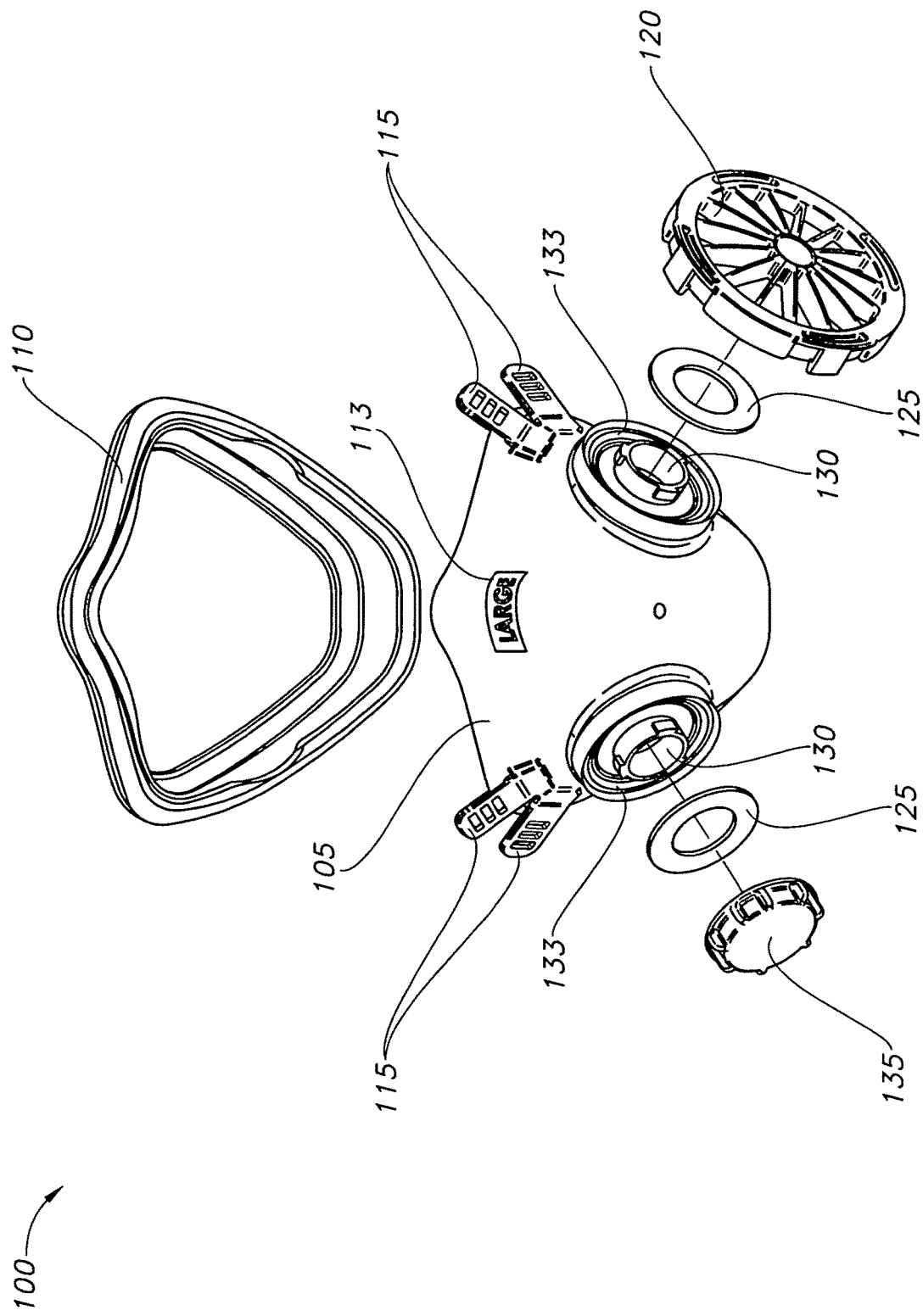
FIGS. 3A-C are drawings of a filtering face mask with a flat cap used to seal one of the filtering valves, according to an embodiment of the invention.
Figure 3B:
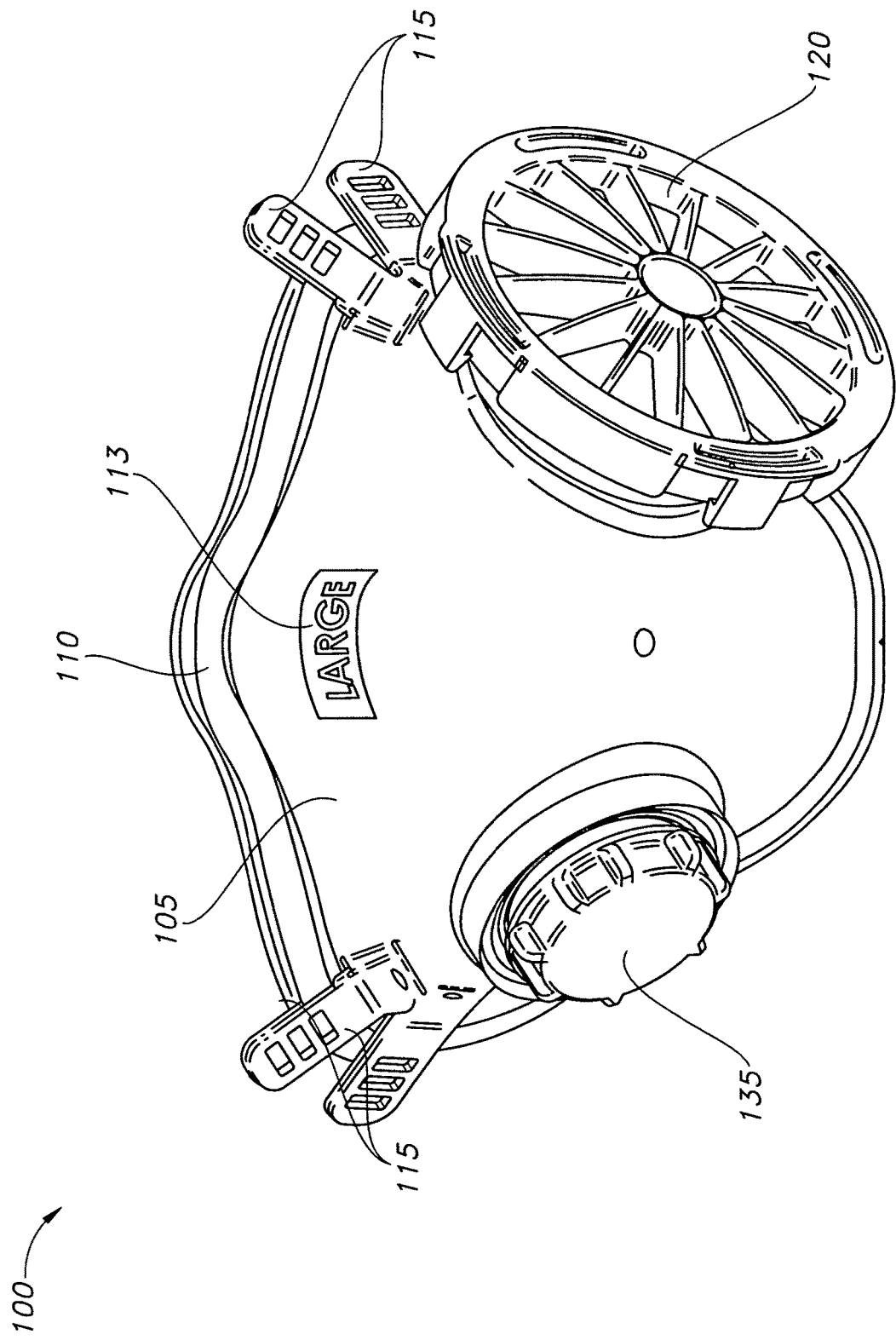

If there is a need or desire for only one of filter housing 120 to be used, a filter cap 135 may be included to seal off the unused filter valve 130 and maintain valve 130 in the closed position. FIG. 3A shows an exploded view of filtering face mask 100 when filter cap 135 is in use. The assembly of filtering face mask 100 when filter cap 135 is in use is similar to the full assembly shown in FIG. 2A, with the exception of filter cap 135 replacing a filter housing 120, as seen in FIG. 3B.

Optionally filter cap 135 can be sized and shaped to merely direct exhalation outflow downward rather than to completely seal off housing 120. When exhalations are directed downward by cap 135, the possibility of the wearer infecting others is minimized.

Figure 3C:
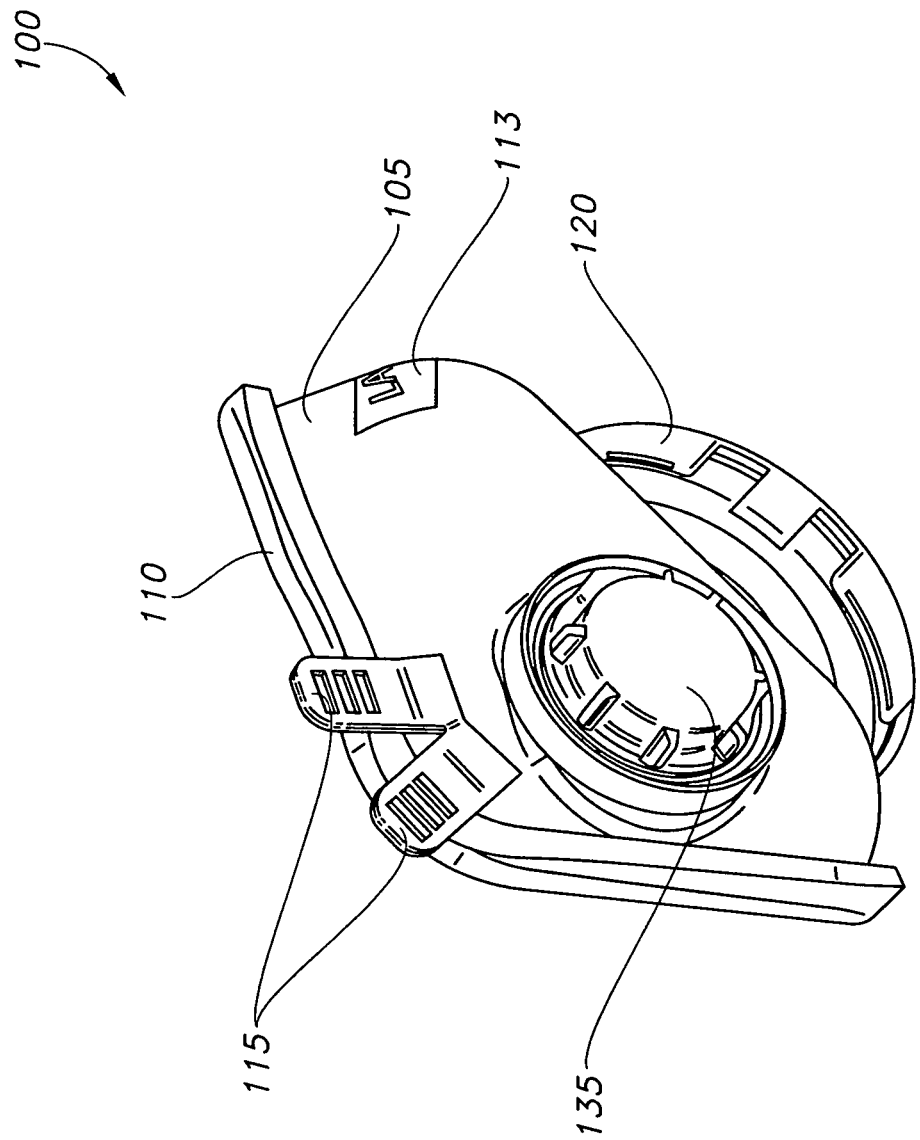

FIG. 3C is a side view of filtering face mask 100 when filter cap 135 is in use. Similar to the positioning of filter housing 120, flat cap 135 is below the line of vision of the wearer, increasing the wearer's field of view. Filter cap 135 may be used on either the left of the right side of filtering face mask 100. In a military or SWAT application, for example, this feature enables the wearer to shoulder a rifle or other long gun, regardless of being left or right-handed. Similarly, this feature enables a journalist to shoulder a camera, or a wearer to operate or transport equipment regardless of handedness or constraints in geometry at the location of use.

Figure 4:
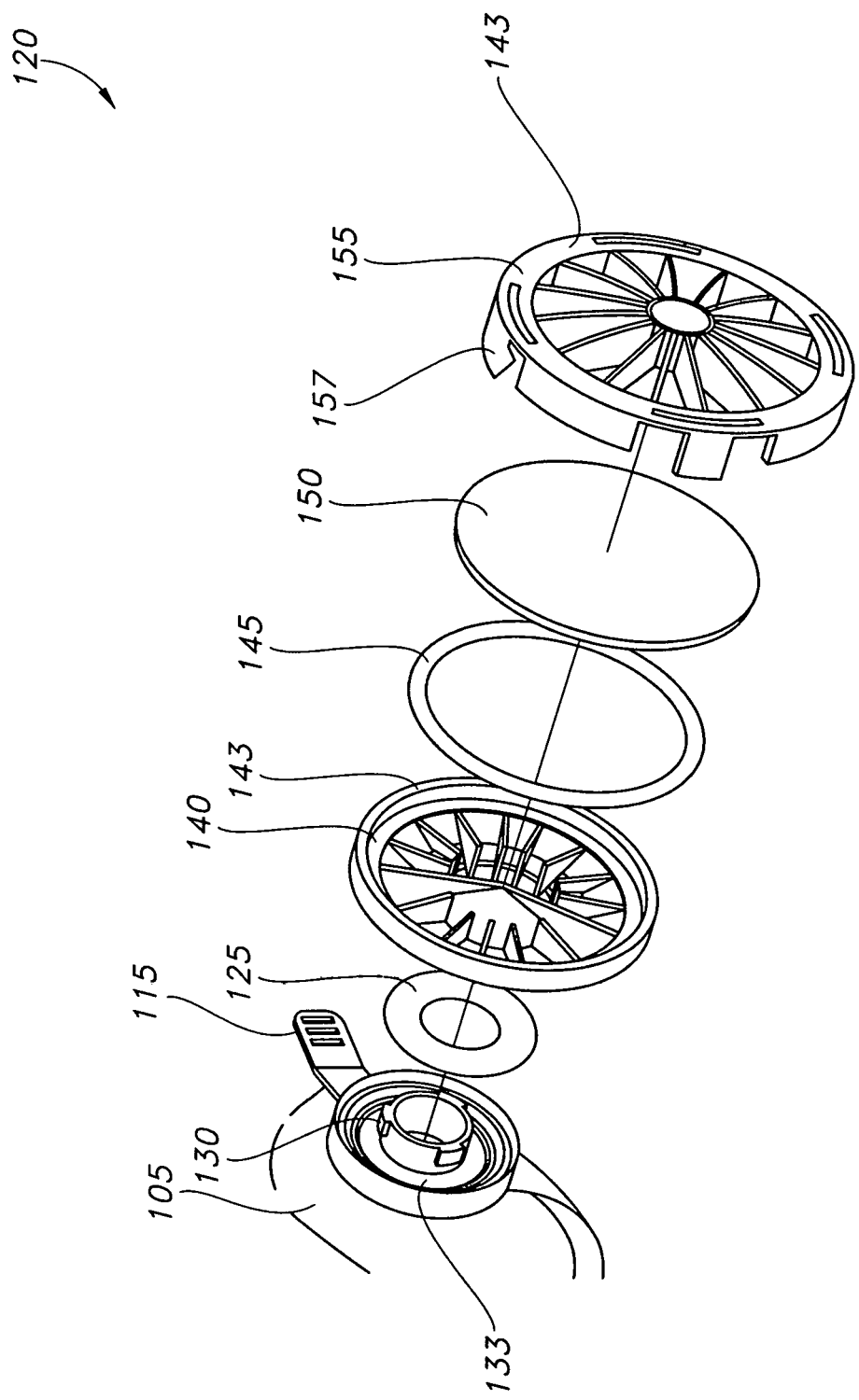
FIG. 4 is an illustration of the construction of a filter housing, according to an embodiment of the invention.

FIG. 4 illustrates the interior construction of filter housing 120 according to one embodiment of the invention. Housing 120 includes filter housing back 140, a plurality of filter housing ribs 143, a filter o-ring 145, filter 150, filter housing front 155, and a plurality of molded snaps 157. Filter o-ring 145 may be made using a variety of materials known to those of skill in the art. In one possible embodiment of the invention, o-ring 145 comprises silicon. Silicon filter o-ring 145 inserts into filter housing back 140 along the inside edge. Filter 150 rests directly over silicon filter o-ring 145. Filter housing front 155 secures over the outer edges of filter housing back 140 with molded snaps 157 holding the pieces together. Filter housing ribs 143 in both filter housing front 155 and filter housing back 140 press tightly together, securing filter 150 against silicon filter o-ring 145, holding both in place and without air gaps between filter 150 and silicon filter o-ring 145.

The construction and operation of filter housing 120 allows filter 150 material to be removed and changed as desired. This feature allows mask 100 to be reused by simply replacing filter 150 when, for example, filter 150 becomes clogged or saturated. The reusability of mask 100 limits the accumulation of biohazard waste caused by the disposable masks of the prior art. Replacing filter 150 additionally allows the filter material to be selected according to the particular hazard or use application.

In one possible embodiment of the invention, filter 150 comprises a fibrous filter material manufactured under the name (Monadnock Nonwoven) MNW® PD-6913 by Monadnock Manufacturing, LLC of Mt. Pocono, PA; the datasheet for which is found on the website of the manufacturer and incorporated herein. According to one embodiment of the invention, each of filters 150 comprise two sheets of PD-6913 material, wherein each individual sheet has a basis weight of approximately 27 grams/m2. This configuration has been tested to be compliant with the National Institute for Occupational Safety and Health (NIOSH) N95 filtration standards. The NIOSH filtering classifications standards are incorporated herein by reference.

Optionally, filters 150 can include common coffee filter paper likely to be available in the field and readily inserted for use. In practice, sheets of coffee filter paper numbering 10 sheets have been found to reduce transmission of airborne pathogens in substantial compliance with the NIOSH N95 standard. Employing a large total numbers of sheets, however, impacts breathability. Reductions in the number of sheets improve breathability but at a lower filtration effectiveness. Using fewer than three sheets of existing brands of coffee filter paper were not shown in tests to mitigate airborne pathogen risks but may be suitable for other uses.

Additional types of filter material known to those of skill in the art may be used to comprise filters 150. Activated charcoal is another possible filter material. Electrostatic papers are an additional type of filter material. Many other types of filter materials are known to those of skill in the art and may be used with the invention. The specific material used can vary as desired to comply with the relevant NIOSH or other filtering standard; or according to what is on hand in the field and acceptable in view of the risks.

Figure 5A:
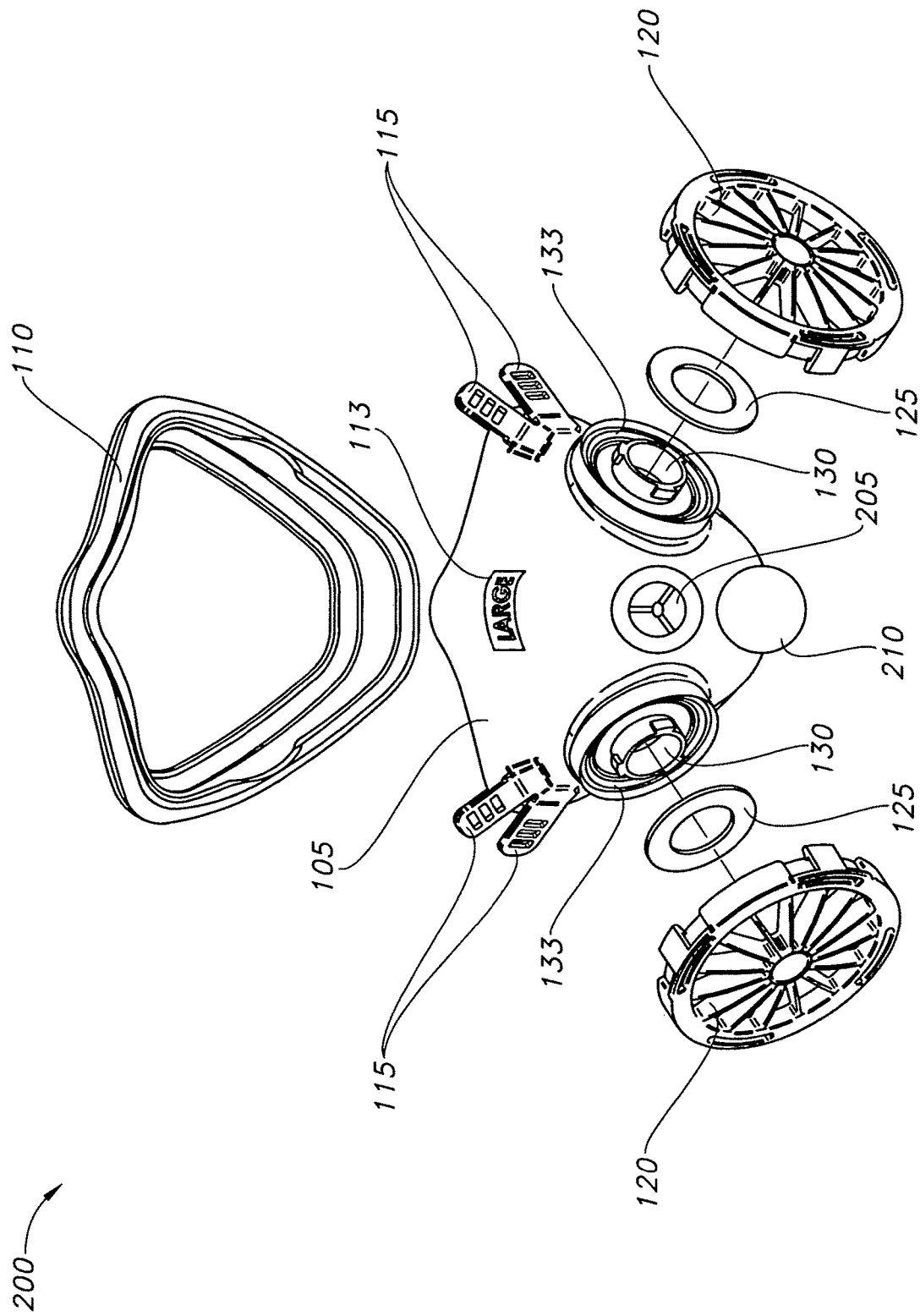
FIGS. 5A-C are illustrations of a filtering face mask respirator use, according to an embodiment of the invention.
Figure 5B:
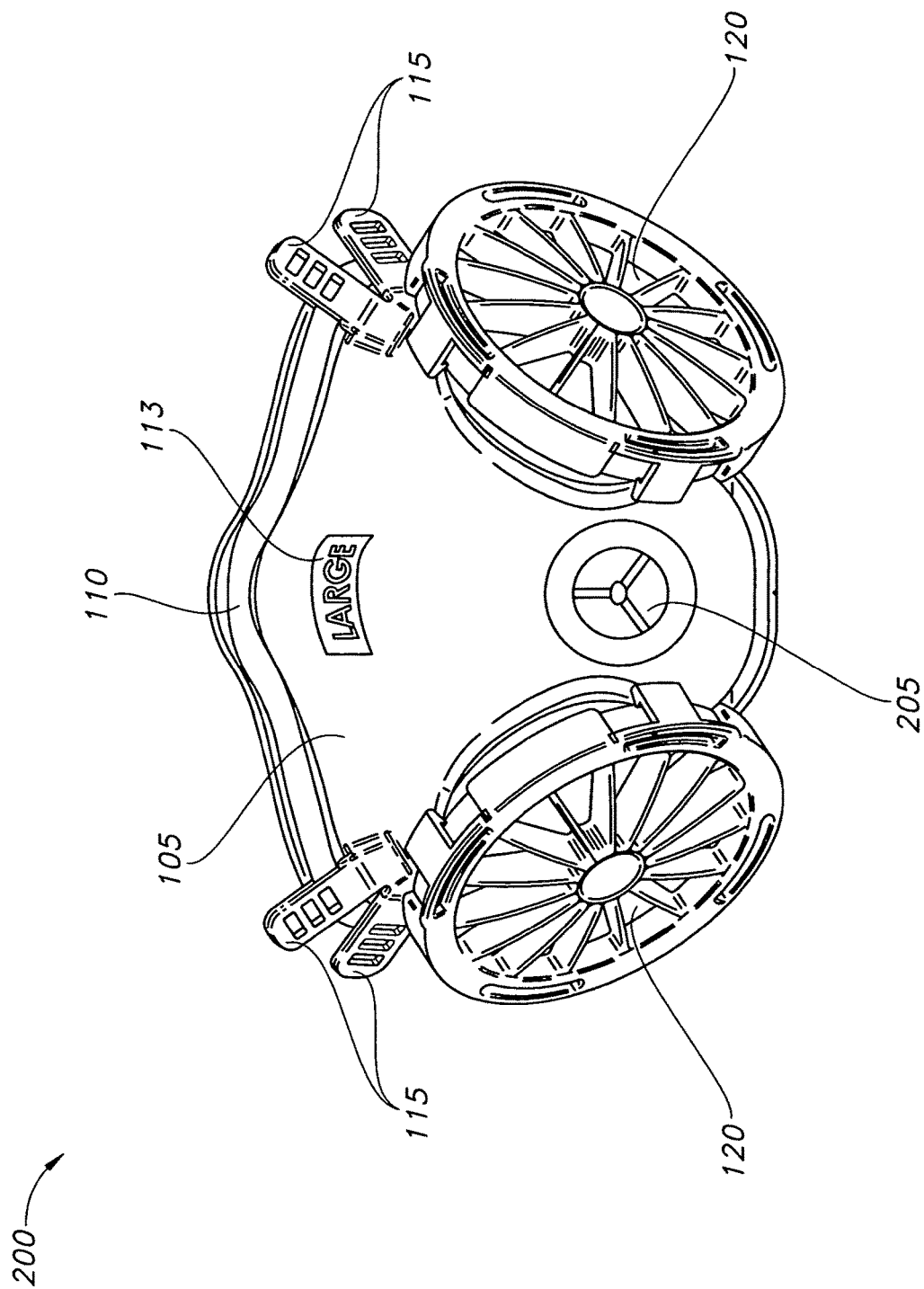

In another embodiment of the invention, the invention may be configured and used as a respirator. An exploded view of the construction of filtering face mask respirator 200 is shown in FIG. 5A. The invention of FIG. 5A includes respirator valve 205 and respirator o-ring 210, which may comprise a silicon o-ring. Filtering face mask 200 is similar to filtering face mask 100 discussed in FIG. 2A, with the exception of the inclusion of respirator valve 205. Silicon respirator o-ring 210 secures around respirator valve 205, creating a substantially airtight seal between filtering face mask respirator 200 and valve 205. Filtering face mask respirator 200 is assembled in a similar manner to filtering face mask 100. Similar to filter valve 130, respirator valve 205 may be secured with quick-click locking mechanism similar to locking mechanism 133. A fully assembled filtering face mask respirator 200 is shown in FIG. 5B.

Valve 205 comprises a one way check (as drawn) or flapper valve that enables flow in a direction opposite to the direction of flow allowed by valves 130. In one possible embodiment of the invention, valve 205 is supported within mask 200 via a triaxial structure 206. In use, during exhalation, valve 205 allows the user's breath to exit, unfiltered, from the mask. During inhalation, valve 205 prevents unfiltered air from being inhaled through valve 205. This embodiment of the invention makes it easier for the user to exhale and some users find the mask less fatiguing to wear. This embodiment of the invention results in unfiltered air being exhaled and therefore does not protect third parties from pathogens exhaled by the wearer. A deflector device may be optionally added at the location of valve 205 to direct exhaled air downward to minimize this potential risk to others.

In a further variation on the invention, optional valves 130 can be included and configured to allow filtered air to pass through filter assembly 120 during inhalation but prevent exhaled air from exiting through the filter. This variation makes exhalation even less difficult for the wearer, since it occurs through valve 205 and need not also be pushed through the filter material. This variant further slows the onset of fatigue from wearing the mask. As described previously in connection with mask 100, filter caps or housing 120 can be configured to also direct air exhaled through filter assembly 120 downward.

Figure 5C:
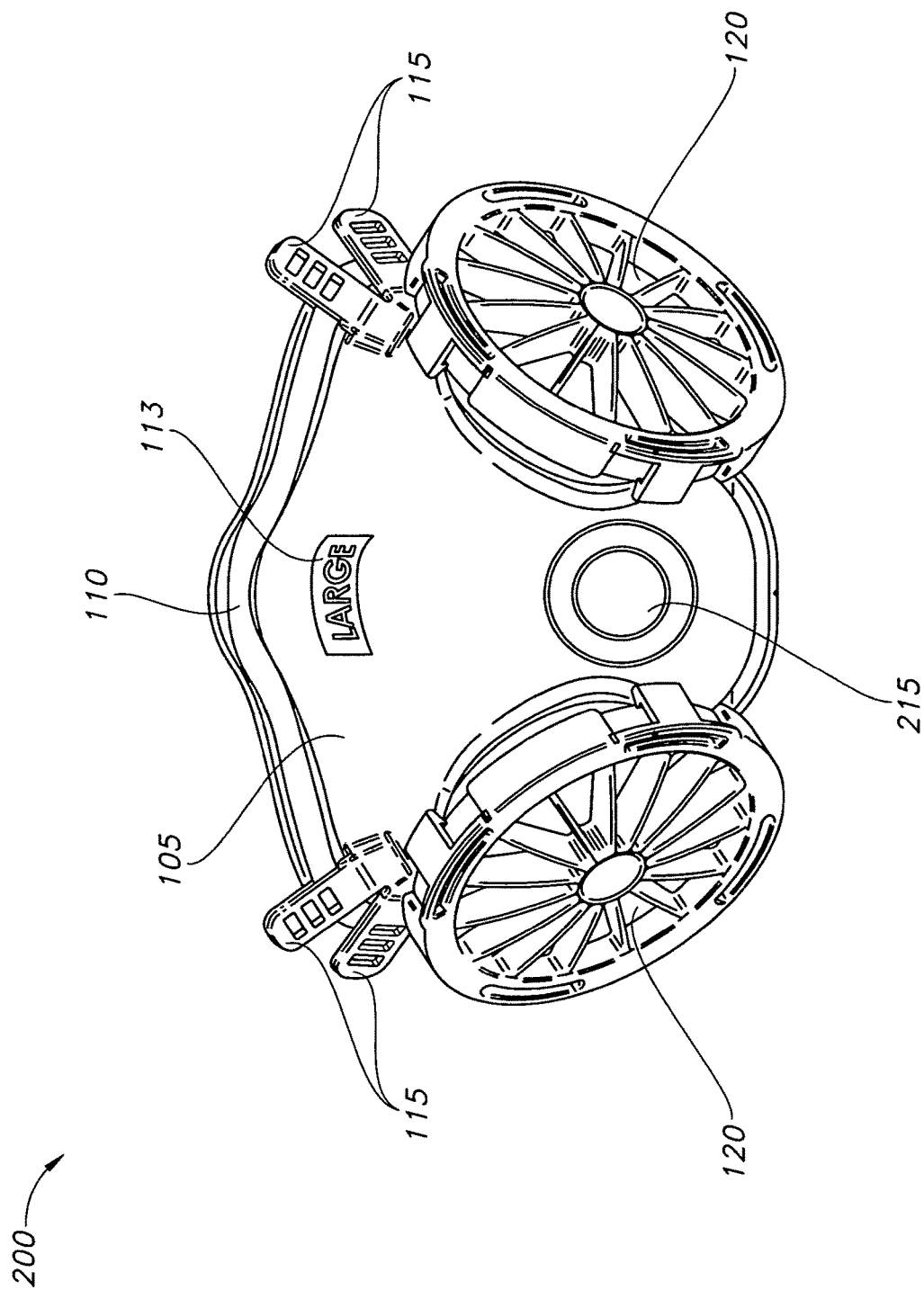

FIG. 5C illustrates an alternative embodiment of the invention wherein valve 205 may be sealed by a respirator cap 215 when the respirator mode of operation is not desired and the user does not wish to exhale via valve 205. In this alternative embodiment of the invention, valves 130 are configured to permit bidirectional flow through filter assemblies 120. With valve 205 sealed off by cap 215, mask 200 functions in a manner like that described in connection with mask 100. Providing a mask with the option of using or disabling valve 205 provides mask 200 with still more utility and flexibility in matching the mask to current conditions and use without needing to procure a new or different mask device.

Similar to mask 100, strap material 122 is woven through lacing slot 123 of mask 200 according to the preference of the wearer. The wearer presses silicon face seal 105 to their face, securing filtering face mask 100 about the wearer's head with strap material 122.

Also similar to mask 100, either of filter housings 120 may be replaced with a cap 135 to seal valve 130. With mask 200, however, should the wearer decide for some reason that air need not be filtered for both of the inhalation and exhalation cycles, both of filter housings 120 may be replaced with a cap 130. In such an embodiment of the invention, valve 205 is a two way valve allowing both inhalation and exhalation to occur unfiltered via valve 205. Such a situation may be uncommon, but might be desirable, for example, where the user requires ease of breathing while transiting through nonhazardous conditions to a hazardous zone, and for some reason cannot easily or quickly don the entire mask apparatus (eg. without removing other significant or cumbersome gear first). In these situations, it may simply be easier and less cumbersome for the user to reattach one or more filter apparatus 120 upon arrival in the region of hazard than to remove the gear necessary to don an entire mask.

Figure 6A:
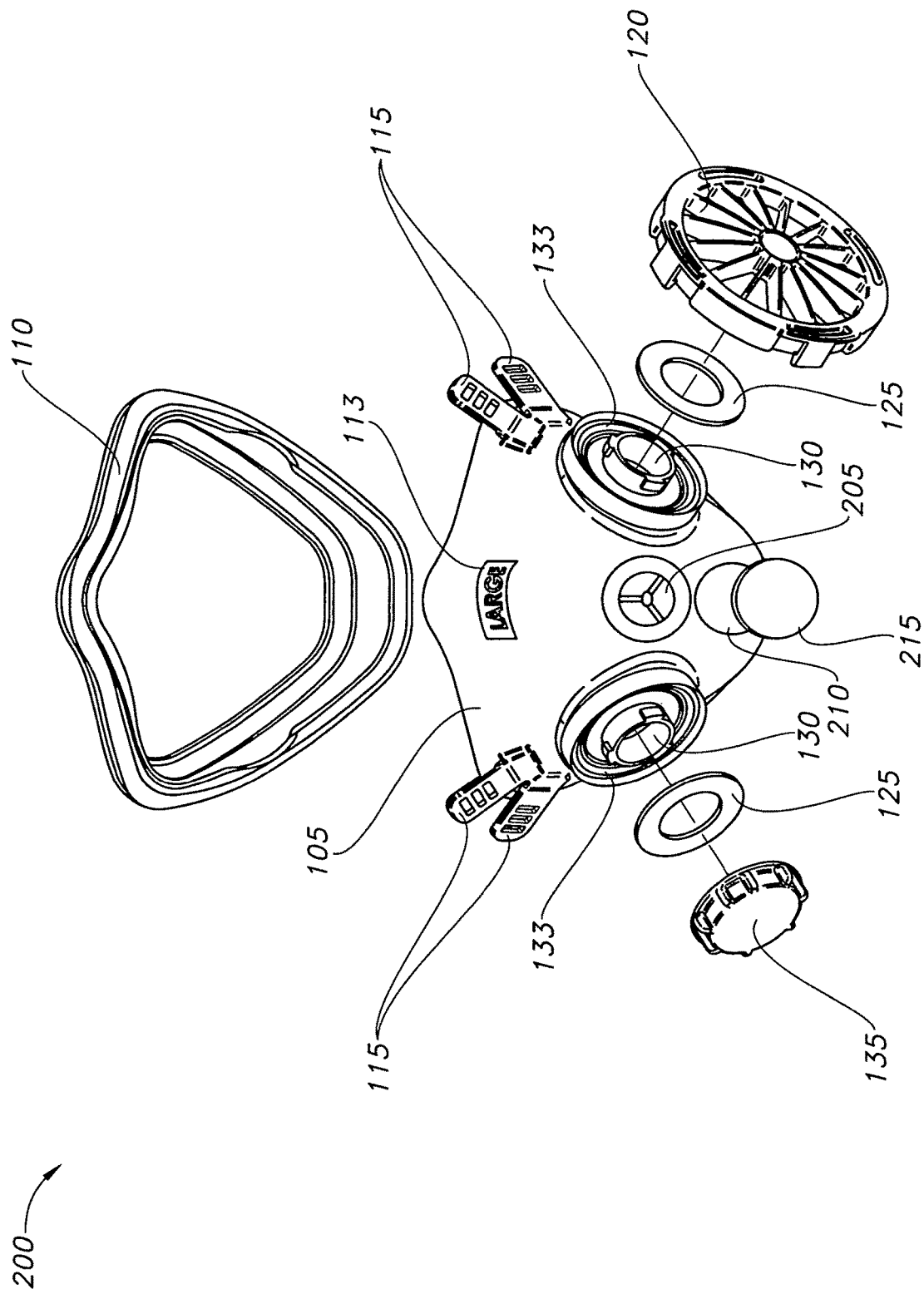
FIGS. 6A-C are drawings of a filter face mask respirator use with a flat cap used to seal one of the filtering valves, according to an embodiment of the invention.
Figure 6B:
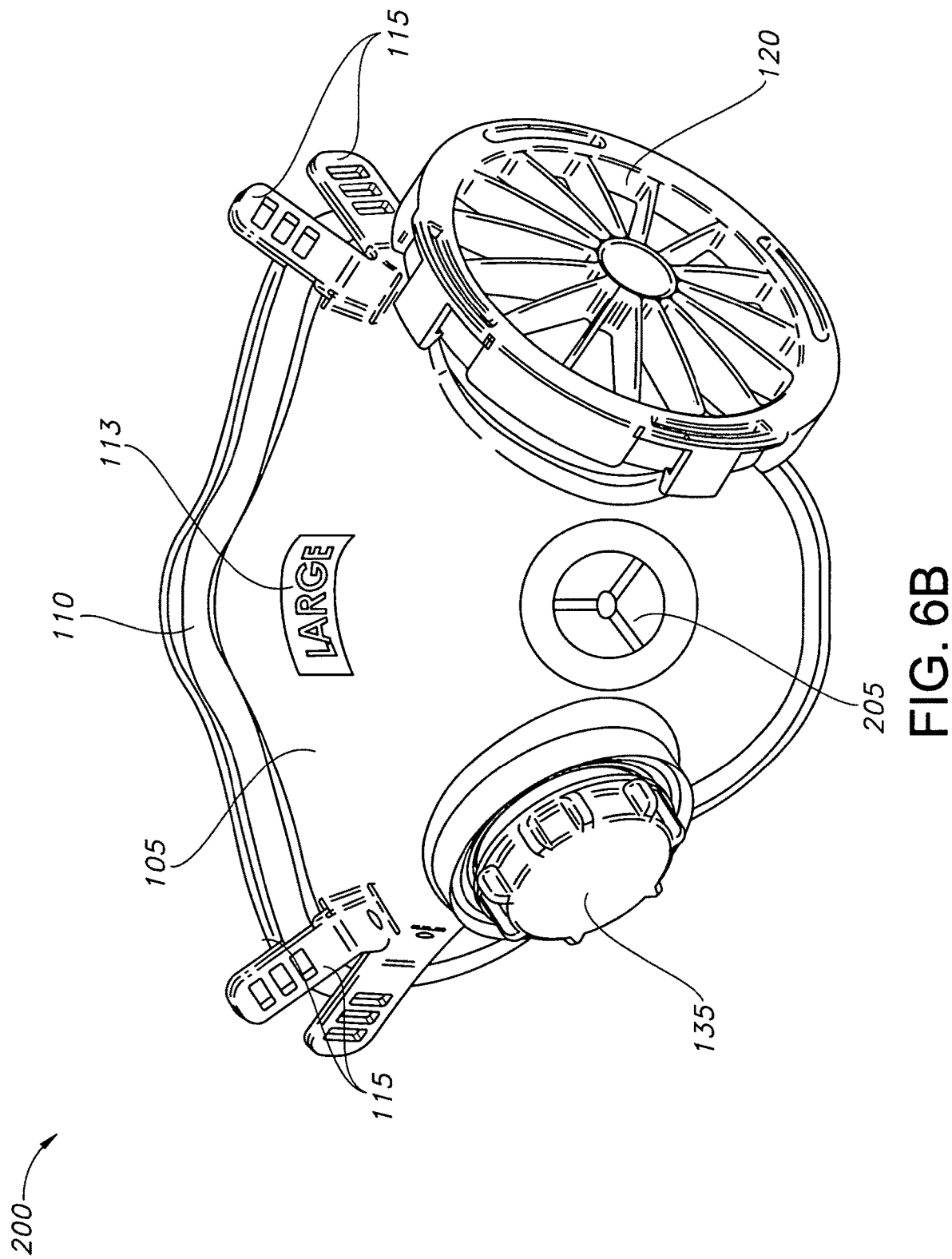
Figure 6C:
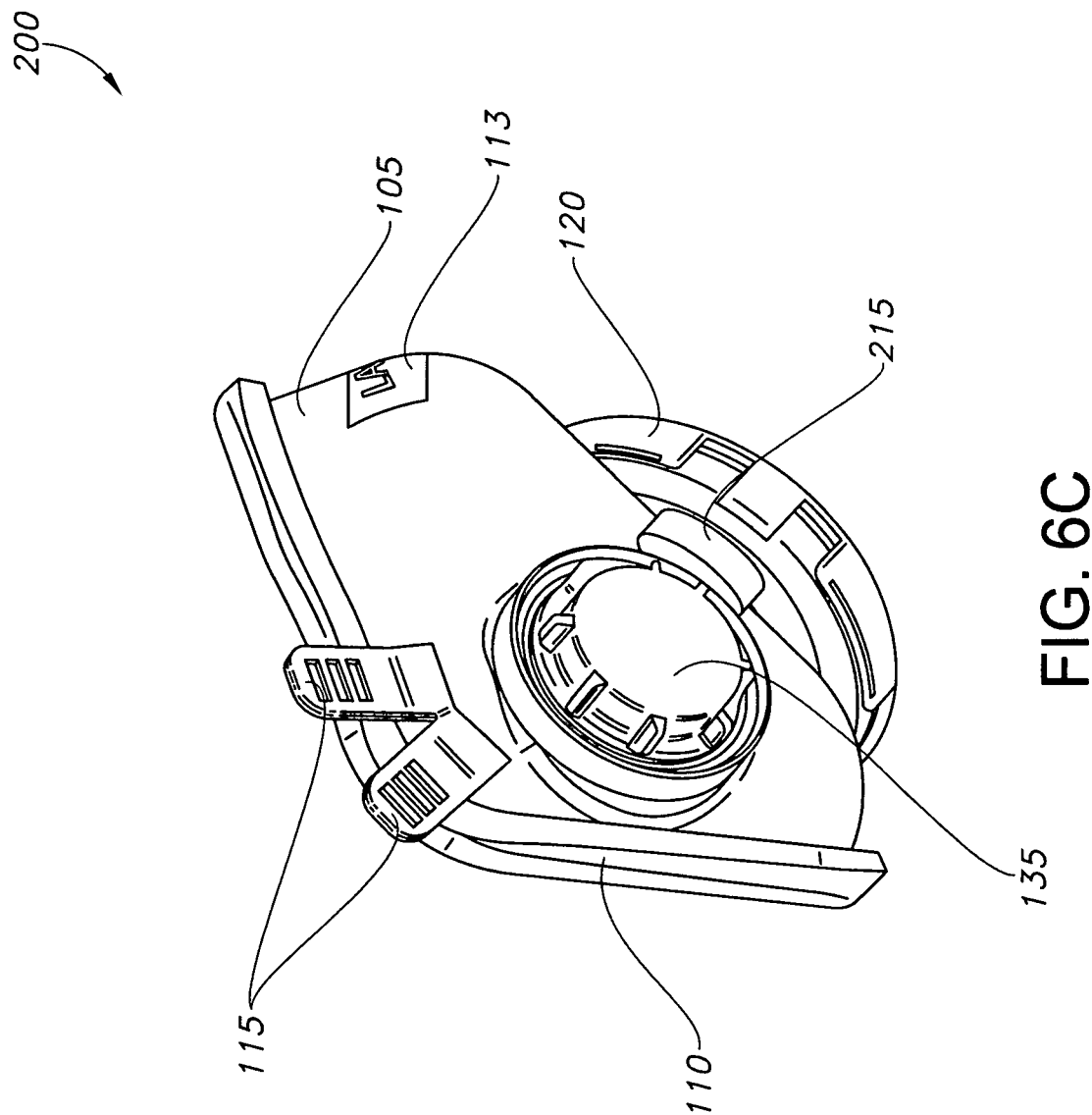

FIG. 6A illustrates mask 200 when a just a single filter housing 120 is not in use. In FIG. 6A, filter cap 135 prevents entry of air at this location and seals optional filter valve 130 when provided. FIG. 6B shows a fully assembled filtering face mask respirator 200 with a single filter cap 135 in use. FIG. 6C is a side view of filtering face mask respirator 200 with filter cap 135 in use. FIG. 6C also illustrates the low profile of respirator valve 205, allowing maximum field of vision to the wearer.

Figure 7A:
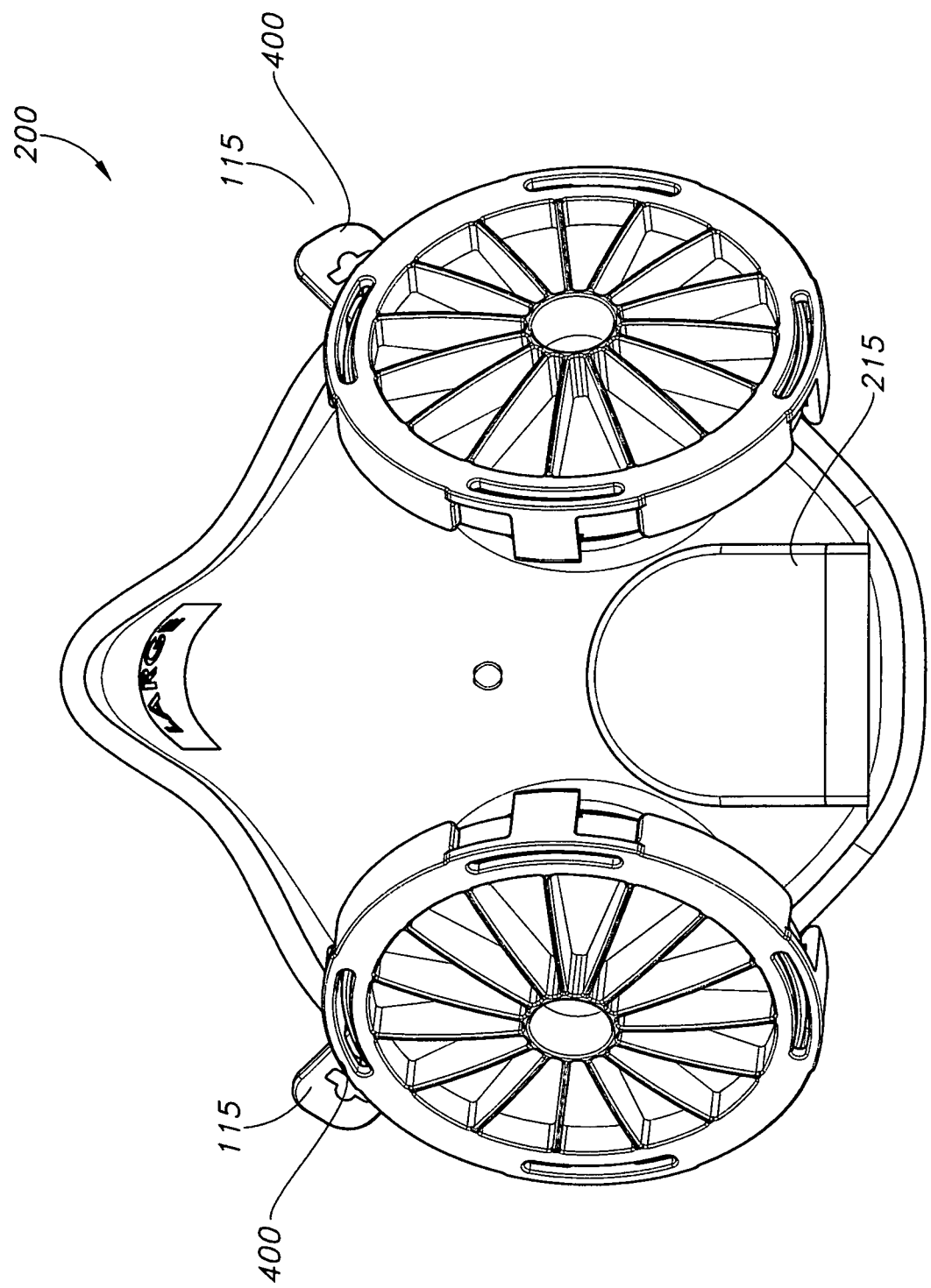
FIGS. 7A-B are front and side views respectively of a filtered face mask respirator including a cover to direct exhalation downward.
Figure 7B:
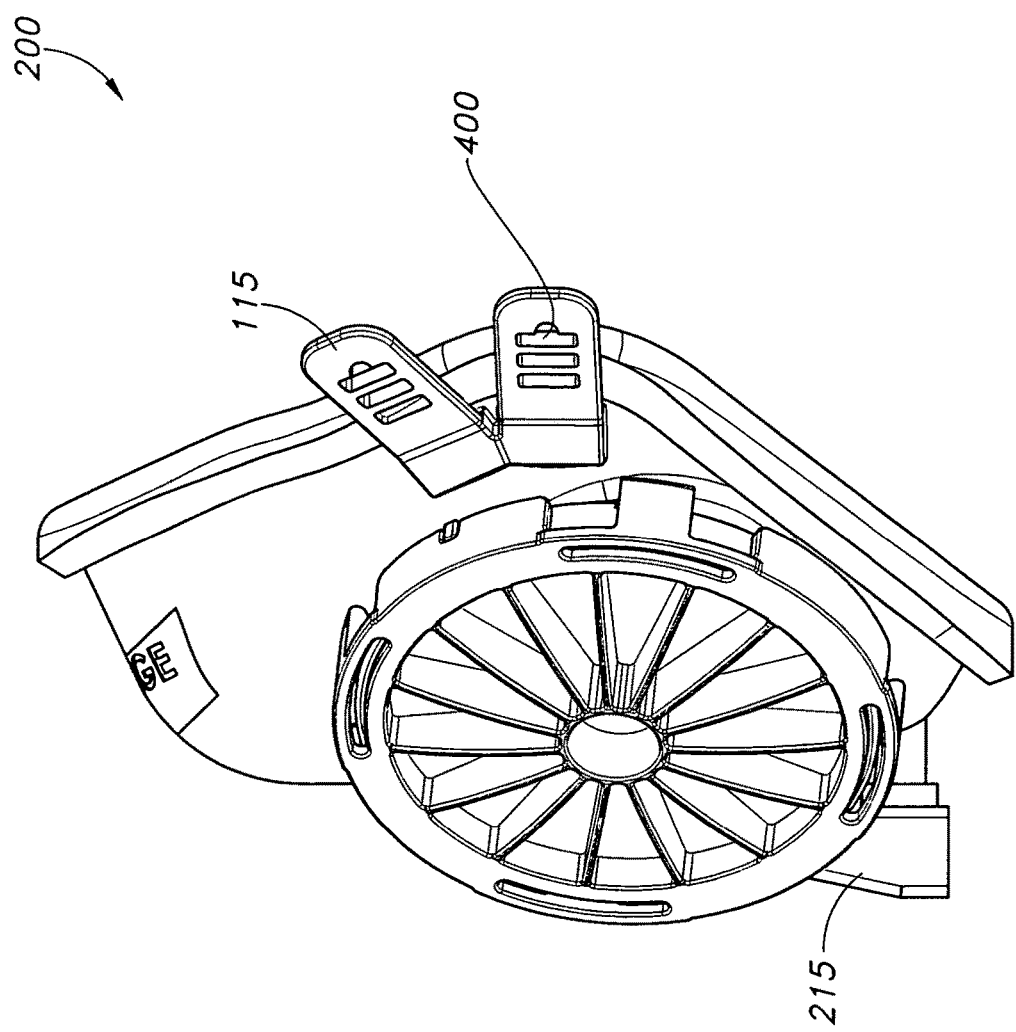

FIGS. 7A and 7B show yet another alternative embodiment of respirator mask 200. Respirator valve 205 is fitted with cap 215. In the embodiment of FIGS. 7A and 7B, cap 215 is configured to direct the flow of air exhaled from valve 205 downward. Directing the exhalation downward minimizes the risk that airborne pathogens exhaled by the mask user are transmitted to bystanders. FIGS. 7A and 7B also show an alternative embodiment of attachment 115 in which a small rounded feature 400 has been added which facilitates the use of rounded attachment straps such as p-cord or rounded shoe laces.

Figure 8:
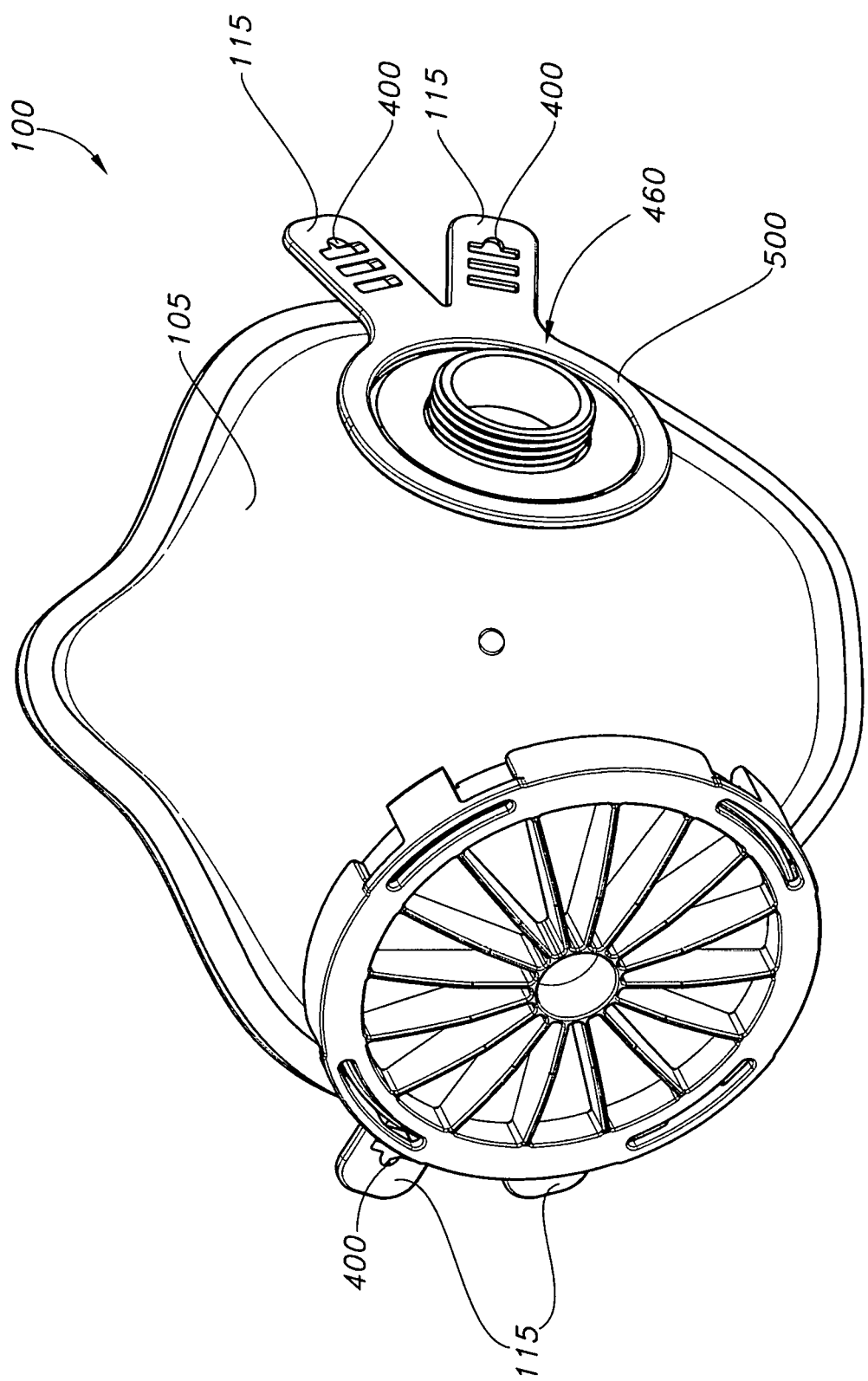
FIG. 8 is an illustration of an alternative locking mechanism and moveable strap attachment mechanism, according to alternative embodiments of the invention.

FIG. 8 shows still more alternative embodiments of the invention. In the embodiment of FIG. 8, filter housing 120 is coupled to mask body 105 via an alternative locking or securing mechanism 460, for example, including a locking male threaded attachment. Mechanism 460 can additionally be used to secure any one or each of valve 130, housing 120; or also to secure valve 205 on mask 200. Locking threads 460 creates a secure attachment to main mask body 105, but may require the user to expend more time to change filters or remove a respiration device relative to the embodiments previously shown.

As also shown in FIG. 8, strap attachment 115 may optionally include a pivoting mechanism that allows attachment 115 to swivel between multiple possible positions. A moveable attachment 115 better accommodates the wearer's facial geometry and allows the user to position the attachment strap locations for comfort and a secure fit. In the embodiment of FIG. 8, the pivoting mechanism includes a ring 500 coupled to attachment 115 which fits around threaded attachment mechanism 460. When housing 120 or cap 135 is loosened about mechanism 460, ring 500 is free to move and the user can swivel attachment 115 into the desired position. Tightening cap 135 or housing 120 fixes ring 500 and attachment 115 in position.

The subject matter defined in the appended claims is not necessarily limited to the specific features or acts described above. Rather, the specific features and acts are disclosed as example forms of implementing the claims. Many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A configurable face mask, comprising:
   a mask body formed of a substantially nonporous material, the mask body comprising a locking male threaded attachment having locking threads that traverse an exterior surface of an entire length of the locking male threaded attachment;
   at least one side housing located on one side of the mask body, the at least one side housing comprising:
      a securing threaded device, wherein the securing threaded device is adapted to engage the locking male threaded attachment of the mask body; and,
      an air-filtering device secured to the mask body by the securing threaded device;
   a strap attachment having a pivoting ring fitted around the locking male threaded attachment of the mask body, wherein the strap attachment is adapted to swivel in relation to the locking male threaded attachment, the securing threaded device adapted to tighten the pivoting ring against the mask body in a locked position; and,
   a valve coupled to the mask body at a location separate from the at least one side housing, wherein the valve permits at least one of an exhalation and inhalation to pass through the face mask.

2. The configurable face mask of claim 1, wherein the air-filtering device comprises a filter housing having a filter.

3. The configurable face mask of claim 2, wherein the filter comprises a fibrous filter.

4. The configurable face mask of claim 3, wherein the fibrous filter comprises non-woven polypropylene material.

5. The configurable face mask of claim 3, wherein the fibrous filter comprises a coffee filter paper.

6. The configurable face mask of claim 2, wherein the filter comprises activated charcoal.

7. The configurable face mask of claim 2, wherein the filter comprises an electrostatic material.

8. The configurable face mask of claim 1, wherein the air-filtering device comprises a cap, wherein the cap is adapted to seal the air-filtering device.

9. The configurable face mask of claim 1, wherein the substantially nonporous material comprises a resin.

10. The configurable face mask of claim 1, wherein the substantially nonporous material comprises a nylon.

11. The configurable face mask of claim 1, wherein the at least one side housing comprises a first and a second side housings, wherein the first and second side housings are located on opposite sides of a longitudinal centerline of the mask body.

12. The configurable face mask of claim 1, wherein the strap attachment is configured to accept a plurality of strap types.

13. The configurable face mask of claim 12, wherein the strap attachment further comprises a mechanism for selecting a position of the strap attachment from a plurality of strap attachment positions.

14. The configurable face mask of claim 1, wherein the at least one side housing further includes a valve.

15. The configurable face mask of claim 1, wherein:
   the at least one side housing further includes a first check valve, wherein the first check valve permits the inhalation; and
   the valve coupled to the mask body comprises a second check valve, wherein the second check valve permits the exhalation.

16. The configurable face mask of claim 15, wherein the air-filtering device comprises a filter.

17. The configurable face mask of claim 1, further comprising:
   a face seal coupled to a rear portion of the mask body.

18. The configurable face mask of claim 17, wherein the face seal comprises silicon.

19. The configurable face mask of claim 1, further comprising:
   an information label located on the mask body.

20. The configurable face mask of claim 1, wherein the face mask is manufactured using additive manufacturing technology.

21. The configurable face mask of claim 1, wherein the nonporous material further comprises a color definable by a red, a blue, and a green color value.

22. The configurable face mask of claim 1, wherein the nonporous material further comprises a color expressible by a hexadecimal value.

23. The configurable face mask of claim 1, wherein the face mask is manufactured using injection molding.

24. The configurable face mask of claim 1, further comprising:
   a cover securable over the valve.

25. A configurable face mask, comprising:
   a mask body formed of a substantially nonporous material, the mask body comprising a first locking male threaded attachment having locking threads that traverse an exterior surface of an entire length of the first locking male threaded attachment;
   a first housing located on a first side of the mask body, the first housing comprising:
      a first securing threaded device, wherein the first securing threaded device is adapted to engage the first locking male threaded attachment of the mask body;
      a first air-filtering device secured to the mask body by the first securing threaded device; and,
      a first strap attachment having a first pivoting ring fitted around the first locking male attachment of the mask body, wherein the first strap attachment is adapted to swivel in relation to the locking male threaded attachment, the first securing threaded device adapted to tighten the first pivoting ring against the mask body;
   a second housing located on a second side of the mask body, the second housing comprising:
      a second securing device, wherein the second securing device is adapted to engage a second locking male attachment of the mask body;
      a second air-filtering device secured to the mask body by the second securing device, wherein at least one of the first air-filtering device and the second air-filtering device further comprises a filter; and,
      a second strap attachment having a second pivoting ring fitted around the second locking male attachment of the mask body, wherein the second strap attachment is adapted to swivel in relation to the second locking male attachment, the second securing device adapted to tighten the second pivoting ring against the mask body.

26. The configurable face mask of claim 25, wherein at least of one of the first air-filtering device and second air-filtering device further comprises a cap, wherein the cap is adapted to seal the air-filtering device.

27. The configurable face mask of claim 25, wherein the filter comprises a fibrous filter.

28. The configurable face mask of claim 27, wherein the fibrous filter comprises non-woven polypropylene material.

29. The configurable face mask of claim 27, wherein the fibrous filter comprises a coffee filter paper.

30. The configurable face mask of claim 25, wherein the filter comprises activated charcoal.

31. The configurable face mask of claim 25, wherein the filter comprises an electrostatic material.

32. The configurable face mask of claim 25, wherein the strap attachment is configured to accept a plurality of strap types.

33. The configurable face mask of claim 25, wherein the second securing device comprises a quick-click cam lock.

34. The configurable face mask of claim 25, wherein the substantially nonporous material comprises a resin.

35. The configurable face mask of claim 25, wherein the substantially nonporous material comprises a nylon.

36. The configurable face mask of claim 25, further comprising:
a face seal coupled to a rear portion of the mask body.

37. The configurable face mask of claim 36, wherein the face seal comprises silicon.

38. The configurable face mask of claim 25, further comprising:
an information label located on the mask body.

39. The configurable face mask of claim 25, wherein the face mask is manufactured using additive manufacturing technology.

40. The configurable face mask of claim 25, wherein the nonporous material further comprises a color definable by a red, a blue, and a green color value.

41. The configurable face mask of claim 25, wherein the nonporous material further comprises a color expressible by a hexadecimal value.

42. The configurable face mask of claim 25, wherein the face mask is manufactured using injection molding.

43. The configurable face mask of claim 25, wherein one of the first air-filtering device and the second air-filtering device further include a valve.

44. The configurable face mask of claim 25, wherein the strap attachment is configured to accept a plurality of strap types, wherein the strap attachment comprises a rounded indentation adapted to receive a rounded-strap type, at least one of the plurality of strap types comprising the rounded-strap type.

45. The configurable face mask of claim 44, wherein the strap attachment further comprises a mechanism for selecting a position of the strap attachment from a plurality of strap attachment positions.

* * * * *